Sept. 12, 1967 R. J. ANATER ET AL 3,341,671

MULTIPLE RADIO FREQUENCY SWITCH WITH IMPROVED SLIDABLE CONTACT STRUCTURE

Filed March 14, 1966 3 Sheets-Sheet 1

INVENTORS.
RAYMOND J. ANATER
BRUCE G. STEINER

BY Le Blanc & Shur

ATTORNEYS.

INVENTORS.
RAYMOND J. ANATER
BRUCE G. STEINER
BY Le Blanc & Shur
ATTORNEYS.

INVENTORS.
RAYMOND J. ANATER
BRUCE G. STEINER
BY Le Blanc & Shur
ATTORNEYS.

3,341,671
MULTIPLE RADIO FREQUENCY SWITCH WITH IMPROVED SLIDABLE CONTACT STRUCTURE

Raymond J. Anater, Akron, and Bruce G. Steiner, Richland, Pa., assignors to Hamilton Watch Company, Lancaster, Pa., a corporation of Pennsylvania Filed Mar. 14, 1966, Ser. No. 533,972
15 Claims. (Cl. 200—16)

This invention relates to switching devices and more particularly to switches for use in radio frequency environments.

The necessity of shielding to prevent unwanted circulation of electrical currents from one circuit to another is well known. It is also well known that electrical coupling can occur between circuit components that are electrically associated by way of interconnecting devices even though the interconnecting device is in its open state. Also, in circuits operating at comparatively high frequency, for example in the radio frequency range, parasitic coupling often occurs, even when shielding is provided. The desire to isolate the output side of an inter-connecting switching device from the radio frequency environment which exists at the input side thereof is especially necessary where radio frequency sensitive or detonatable devices are to be controlled. The necessity of an inexpensive radio frequency isolating switch is especially useful to prevent accidental detonation of electro-explosive devices in radio frequency environments.

It is accordingly an object of this invention to provide a switching device which is capable of isolating spurious radio frequency signals.

It is another object of this invention to provide complete radio frequency isolation between the input and output sides of a switching device.

It is still a further object of this invention to provide physical separation between the input and output leads associated with a switching device.

A still further object of this invention is to provide a switching device which is capable of controlling the activation of a plurality of output circuits and to isolate the circuits controlled thereby to prevent unwanted flow of radio frequency between the input and output sides of the switch.

A still further object of this invention is to provide a radio frequency isolation interconnecting device which is of simple construction and of economic design.

Yet a further object of this invention is to provide a radio frequency isolation switch which is of rugged construction and capable of repetitive operation without malfunction or breakdown.

These and further objects and advantages of the invention will be more apparent upon reference to the following specifications, claims and appended drawings wherein:

Figure 1:
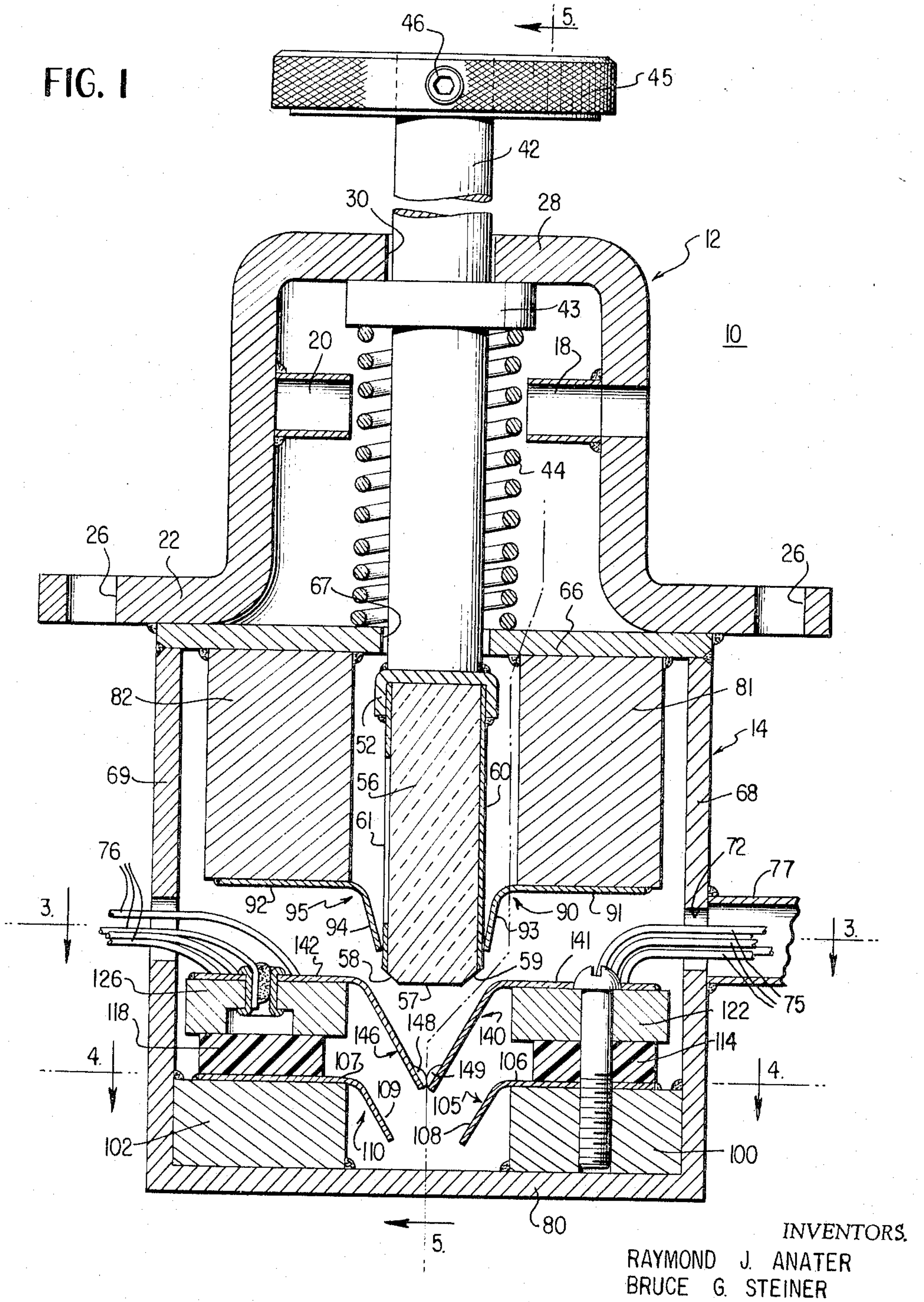
FIGURE 1 is a sectional elevational view of a radio frequency multipole switching device constructed according to the invention and illustrates the working relationship between the structural elements making up the same.
Figure 5:
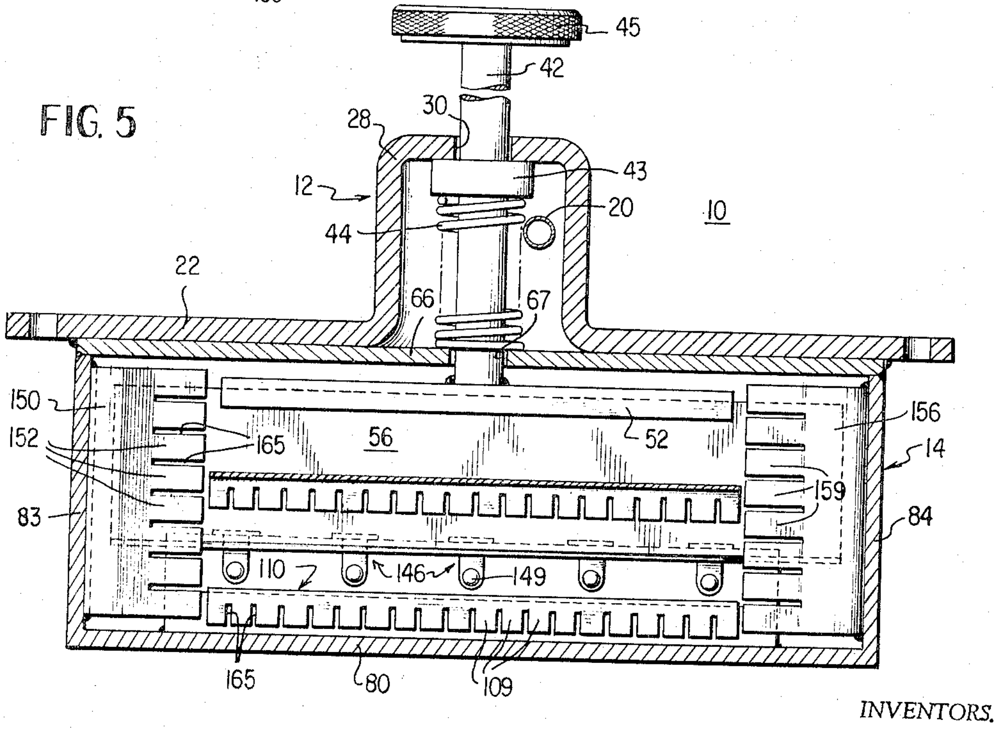
Figure 6:
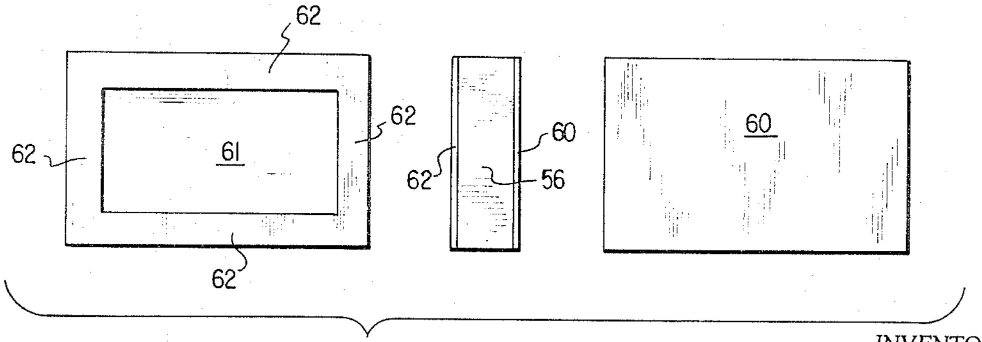

FIGURE 5 is a side sectional elevational view taken along the line 5—5 of FIGURE 1 and illustrates the physical relationship between the various grounding strips provided with the switch in its closed position; and, FIGURE 6 illustrates the input side view, output side view, and edge view of the switch blade utilized in the invention and more particularly brings out the difference in amount of conducting area provided on the input side of the switch blade and the output side.

Referring now to the drawings, and particularly FIGURE 1 the invention shown generally by the numeral 10 includes a bell-shaped plunger housing 12 which is rigidly and fixedly mounted centrally of a generally rectangular switch contact housing 14. Bell-shaped plunger housing 12 is provided with an integrally formed circular mounting flange 22 which by way of appropriate apertures 26 is capable of rigidly and fixedly mounting the switching unit to an appropriate housing of a system which the switch 10 will control. It is obvious that the switch unit 10 will be fixedly positioned to an appropriate housing such that the plunger will be protruding outwardly thereof for manual activation and control of the switching unit, while, at the same time, the switch contact housing 14 will project inwardly of the same to provide adequate protection therefor.

Bell-shaped plunger housing 12 is provided with an integrally formed upper plate 28 having a central aperture 30 formed therein. An aperture 16 is provided in the bell-shaped housing adjacent the upper plate 28 for receipt of an appropriately formed retaining pin, the purpose of which will be explained hereinbelow. Further, as shown in FIGURE 1, a pair of axially aligned tubular projections 18 and 20 are fixedly mounted along the inner surface of bell-shaped housing 12. Tubular projection 18 is shown to be aligned with aperture 16.

Plunger 42 is slidably mounted for reciprocal movement through aperture 30 in a manner as shown in FIGURE 1. Plunger 42 is of circular cross section and of slightly smaller outside diameter than the aperture 30 through which it reciprocally projects. A collar 43 is integrally formed to the plunger 42 to limit the extent of outward movement of the plunger through the bell-shaped housing 12. A biasing spring 44 is disposed about the plunger between collar 43 and the top of housing 14. Collar 43 is accordingly biased in a normally abutting relationship with the inner surface of plate 28 to position plunger 42 in a normal outwardly extending position. Plunger 42 is also provided with a knurled cap 45 which is removably mounted to the plunger 42 by way of an appropriate set screw 46. In this manner upon a suitable downwardly directed force being applied to plunger 42 movement of the same into a recess formed in housing 14 is accomplished. It is, of course, clear that upon a downward movement of plunger 42 collar 43 will be moved against the biasing spring 44 to compress the same. Accordingly, unless an appropriate retaining means is provided plunger 42 will immediately return to its outward position by way of the compression force provided by biasing spring 44 against collar 43.

As described hereinabove, see FIGURE 1, a pair of axially aligned tubular projections 18 and 20 are fixedly positioned along the inner surface of bell-shaped plunger housing 12, with tubular projection 18 being aligned with aperture 16 of bell-shaped plunger housing 12. Accordingly, upon a downwardly directed force being applied to plunger 42 to compress biasing spring 44 and move collar 43 below the tubular projections 18 and 20, a suitable retaining pin 47 to be discussed in more detail hereinbelow in connection with FIGURE 2, may be inserted through aperture 16 and axially aligned tubular members 18 and 20 to prevent upward movement of the plunger 42 until the desired time.

Fixedly mounted to plunger 42 for reciprocal movement therewith is a longitudinally extending channel-shaped member 52. Channel-shaped member 52 provides the means for mounting a rectangular-shaped longitudinally extending switch blade 56. As shown, the width of switch blade 56 is substantially equal to that of channel-shaped member 52 for edge mounting therewithin. Switch blade member 56 is fixedly positioned therewithin by means of any suitable attaching means such as welding, etc. The switch actuating end 57 of the switch blade 56 is provided with chamfered surfaces 58 and 59 to facilitate movement through the housing recess and permit sliding engagement with the resilient grounding member and switch contacts elevationally disposed therealong. For a purpose to be explained in more detail hereinafter, switch blade 56 is made of epoxy glass, or, in the alternative, any other suitable non-conductor material may be utilized. The longitudinally extending sides of switch blade 56 are provided with a thin copper film that is formed upon the epoxy glass by conventional printed circuit methods. As shown in FIGURE 6, the input side of the switch blade 56 is formed with a continuous copper surface 60 whereas the copper of the innermost portion 61 of the output side has been etched away to form a copper frame or band about the perimeter of the switch blade. The remainder of the output side of switch blade 56, with the exception of the perimeter frame 62, is glass epoxy and accordingly, non-conductive.

Figure 3:
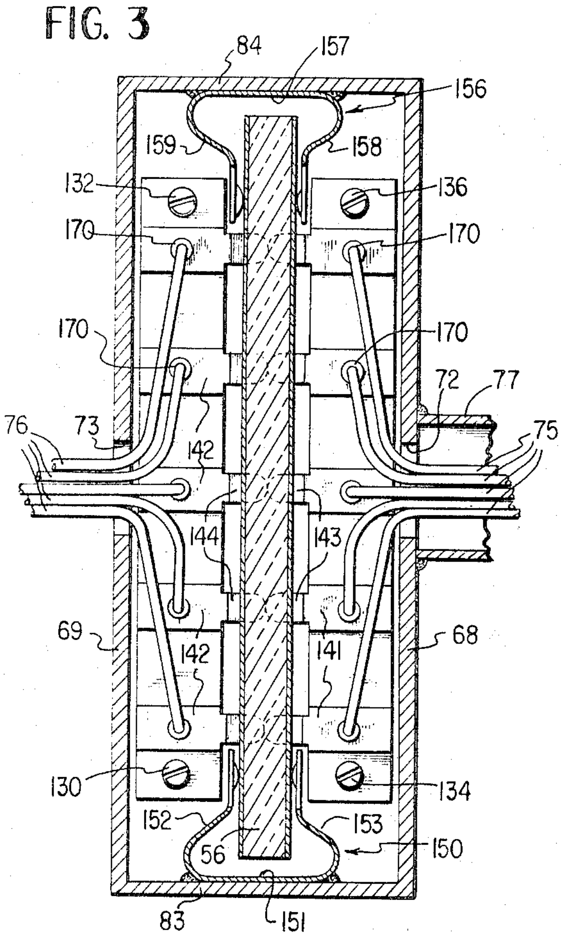
FIGURE 3 is a sectional plan view taken along the plane 3—3 of FIGURE 1 and illustrates the relationship between the switch blade, the switch contacts, with the same in their closed positions, and further illustrates input and output leads being connected to appropriate terminals of said switch contacts.
Figure 4:
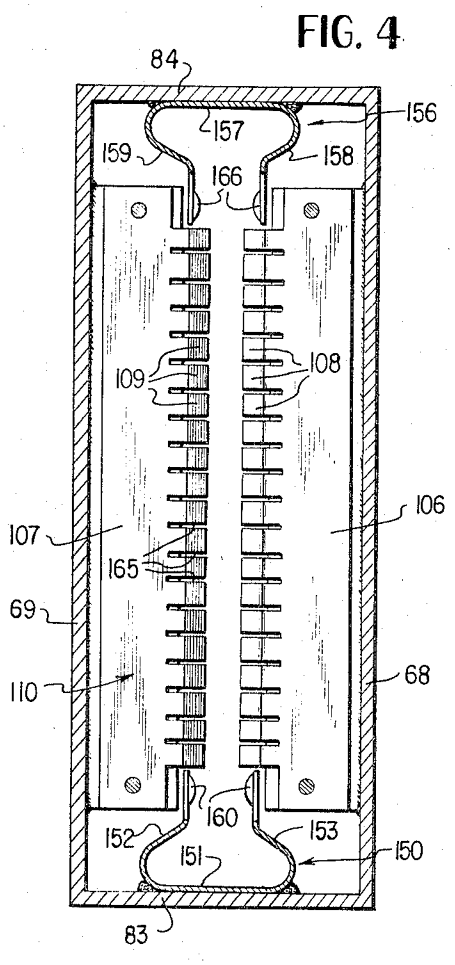
FIGURE 4 is a sectional plan view taken along the plane 4—4 of FIGURE 1 and illustrates the physical relationship between the lower-most, laterally extending grounding strips and the end mounted grounding strips.

Returning now to a description of the switch contact housing 14, FIGURES 1, 3 and 4 illustrate the housing 14 to be of substantially rectangular design and to have an upper plate 66 with an aperture 67 for slidable receipt of plunger 42 therethrough. Aperture 67 is of slightly larger diameter than the outside dimension of plunger 42 to enable reciprocal movement of the plunger 42 therethrough. In addition housing 14 is provided with longitudinally extending sides 68 and 69, each having apertures 72 and 73 respectively formed therein. Aperture 72 provides the means for passage of input leads 75 into the housing, whereas aperture 73 enables passage of output leads 76. Also, a fragmented portion of a tubularly shaped radio frequency shield 77 is shown in FIGURE 1 fixedly connected to side 68 in line with aperture 72, for a purpose to be hereinafter discussed. Housing 14 is also provided with a longitudinally extending bottom 80, as shown in FIGURES 1 and 5 especially. In addition opposed vertically extending front 83 and rear 84 faces, see FIGURE 5 for example, are provided to close the rectangular housing 14.

Looking to FIGURE 1 we note that various mounting elements, contacts, grounding strips, etc. are elevationally and longitudinally aligned in opposed relationship within housing 14, for contact with selected portions of opposite faces of switch blade 56. The opposed relationship of the various elements define a central elevationally extending recess through which the switch blade 56 moves in response to a downwardly directed force being applied to plunger 42. More particularly, a pair of grounding strip support bodies 81 and 82 are shown to be fixedly attached to upper plate 66 of housing 14 and to extend for substantially the entire longitudinal length thereof. In the preferred embodiment grounding plate support bodies 81 and 82 are formed of brass, however, any suitable substitutes may be utilized. In actual form, ground plate support bodies 81 and 82 are elongated rectangular members which are fixedly attached, such as by welding for example, to upper plate 66 of housing 14, along the longitudinal dimension thereof. The depth to which the support bodies 81 and 82 extend into housing 14 is established by position of switch blade 56 in its unactivated condition.

Specifically, grounding strips 90 and 95 which include horizontal longitudinally extending portions 91 and 92 which are brazed, welded or otherwise secured to the support bodies 81 and 82 in a manner as shown by FIGURE 1, and downwardly extending edges 93 and 94 which in their normal position contact conducting segments of opposite sides of the switch blade 56 in a manner as shown in FIGURE 1. As illustrated, grounding strips 90 and 95 are elevationally positioned at pre-established positions to insure engagement with electrical conducting portions of the switch blade 56 irrespective of the position of plunger 42. While the grounding strips 90 and 95 may be mounted in fixed position within housing 14 for engagement with switch blade 56 in any suitable manner, the embodiment illustrated depicts the use of grounding plate support bodies 81 and 82. However, it should be appreciated that suitable substitutes may be utilized. Because of the elevational disposition of grounding plates 90 and 95 to insure continuous contact by their downwardly extending edges 93 and 94 with electrical conducting portions of the switch blade, irrespective of the position of the plunger 42, an effective radio frequency barrier is established for any radio frequency signals that may enter the housing 14 by way of the plunger mounting apertures. More detailed description of grounding strips 90 and 95 will follow hereinbelow in connection with the explanation of FIGURE 4.

As best seen in FIGURE 1, suitable support and spacing elements elevationally extend in opposed relationship from base 80 of housing 14. As shown, the support and spacer elements are positioned on opposite sides of the path of travel of switch blade 56. The support and spacer elements accordingly help define the central recess formed in housing 14 into which switch blade 56 is reciprocally movable. As illustrated in FIGURE 1, ground strip support blocks 100 and 102 are fixedly secured, by welding for example, to base 80 of housing 14. While the ground strip support blocks may have been made of any suitable design, in the actual embodiment illustrated they comprised longitudinally extending rectangular blocks which are made of brass or any other electrically conducting material. The diagonally downwardly extending grounding strips shown generally by numerals 105 and 110, have horizontal portions 106 and 107, respectively, fixedly mounted upon the ground support blocks 100 and 102. The actual structural make-up of grounding strips 105 and 110 will be explained in greater detail hereinbelow. Spacer blocks 114 and 118 are positioned upon the horizontal portions 106 and 107 of grounding strips 105 and 110 in the manner shown. Lastly, glass epoxy contact isolator blocks 122 and 126 are positioned upon spacer blocks 114 and 118 respectively. The contact isolator block 126, spacer 118, and grounding strip support block 102 are threadedly connected together by suitable screws 130 and 132, as seen in FIGURE 3. In a similar manner contact isolator block 122, spacer 114 and grounding strip support block 100 are secured in the vertical relationship shown by FIGURES 1 and 3 by suitable screws 134 and 136. Also, switch contacts, generally shown by numerals 140 and 146, are shown to have horizontal portions 141 and 142 thereof secured to the glass epoxy isolator blocks 122 and 126, and to include a plurality of diagonally extending, fixedly positioned, longitudinally spaced fingers 143 and 144, see FIGURE 3, in opposed contacting lateral relationship one to the other and having suitable wiper contacts 148 and 149 in normally contacting position.

In addition, resilient spring-type grounding strips shown generally by numerals 150 and 156 are provided at opposite ends of rectangular switch housing 14, see FIGURES 3 and 4. As shown the spring-type strips each include a vertically extending main body 151 and 157 which are fixedly connected respectively to the front and rear faces 83 and 84 by way of welding, brazing, or any other suitable securing means. Extending from each side of the elevationally disposed members 151 and 157 are a plurality of bowed contact carrying fingers 152–153 and 158–159. As shown the bowed contact fingers extend longitudinally into the recess of housing 14 into which switch blade 56 is mounted for movement. As a result of the projection of the bowed resilient finger substantially across the entire elevational extent of housing 14 the contact fingers 152–153 and 158–159 of the grounding strips 150 and 156 are in continuous engagement with conducting portions of both the input and output side of switch blade 56. A detailed description of the spring-type grounding strips 150–156 follows hereinafter in relationship to the explanation of FIGURES 3 and 4 and 5. Merely for the purpose of introduction, but also to initially treat the cooperation between switch blade 56 and switch contacts 140–146, FIGURE 1 illustrates plunger 42 in its normally inoperative position. In the normally inoperative position as shown by FIGURE 1 the plurality of switch contacts 140–146 are in their engaged conducting position in longitudinally spaced, laterally opposed relationship along the switch blade 56 recess formed in housing 14. Switch contacts 140 and 146 are elevationally disposed in the housing 14 recess between grounding strips 90, 95 and 105, 110. Accordingly upon the switch blade 56 assuming its actuated position in response to a downwardly directed force being applied to plunger 42, the output side contacts 146 will engage the non-conducting portion 61 of the switch blade to thus prevent any conduction between the input and output sides of the switch. On the other hand, with the plunger in its uppermost position as shown by FIGURE 1, the output and input switch contacts 146 and 140, by reason of their resilience are in contact to provide electrical conduction between the input and output sides of the switch.

Turning now to a detailed discussion of the structural make-up of grounding strips 90, 95, 105 and 110, and since the grounding strips are of similar design they will be discussed together with emphasis upon the lower grounding strips 105 and 110, which are shown in plan in FIGURE 4. The grounding strips are made of suitable electrical conducting material to insure proper grounding of electrical signals. As has been discussed grounding strips 90 and 95 are suitably secured to support bodies 81 and 82, whereas, grounding strips 105 and 110 are secured to ground strip support bodies 100 and 102. Accordingly, the pairs of cooperating grounding strips are elevationally spacially removed from each other and project into the recess of housing 14 into which switch blade 56 is reciprocally movable. As shown in FIGURE 4, grounding strips 105 and 110 substantially extend across the transverse dimension of housing 14. Looking to FIGURE 1 it will be noted that grounding strips 90 and 95 similarly extend substantially across the transverse dimension of housing 14.

The grounding strips 105 and 110 are provided with longitudinally extending body members 106 and 107 respectively for fixed mounting, as by welding, brazing, etc., to grounding strip support blocks 100 and 102. Grounding strips 90 and 95 are likewise provided with horizontal longitudinally extending body members 91 and 92 which are fixedly mounted to the support bodies 81 and 82. As previously mentioned, grounding strips support blocks 100 and 102 and also the support bodies 81 and 82 are made of brass to insure that any currents conducted through the grounding strips will be carried to ground. In addition the grounding strips 90, 95 and 105, 110 are provided with a plurality of laterally extending longitudinally spaced resilient fingers 93, 94 and 108, 109 respectively. The resilient fingers of each pair of grounding strips are angularly downwardly disposed in opposed relationship one to the other into the recess of housing 14, about the path of movement of switch blade 56. Accordingly, upon plunger 42 being moved downwardly by an appropriately applied force, grounding strips 105 and 110 will contact conducting segments of opposite sides of the forward-most edge of switch blade 56 to suitably ground the same. Moreover, upon the plunger 42 assuming its downward position, the ground strips 90 and 95 will contact opposite sides of the switch blade 56 along the upper surface thereof, and switch contacts 140 and 146, to be described in greater detail hereinafter, will be opened. More particularly, as has been discussed, since switch blade 56 is provided with an electrically conductive copper film 60 across the entire extent of the input side, input switch contacts 140 will be grounded by both grounding strip 90, and ground strip 105, upon switch blade 56 assuming its actuated position in the recess of housing 14. The same is not true on the output side, which, as shown in FIGURE 6 is substantially a glass epoxy surface 61 with the exception of the conducting perimeter band of copper film 62. In the actuated downward position of switch blade 56, the resilient fingers 94 of ground strip 95 will make contact with the upper perimeter band of electrically conducting copper 62, the resilient fingers 109 of ground strip 110 will make contact with the lower band thereof, and output switch contacts 146 will be open but unshorted and ungrounded because of their contact with non-conducting portion 61.

The blade engaging edges of grounding strips 90, 95, and 105, 110 are serrated. As a result of serrating the blade engaging edges of the last mentioned members a uniform spring tension on the switch blade 56, with a minimum of friction to accordingly permit ease of insertion and withdrawal of the plunger by minimizing the friction which must be overcome when the switch is operated, results. Furthermore, if the design of the serrations is proper, their mechanical advantage can be realized without comprising the electrical characteristics of the grounding strips. The serration widths 165 which exist between adjacent resilient fingers 108 and 109 of grounding strips 105 and 110, respectively and, as well, the spacing between adjacent resilient fingers 93 and 94 of grounding strips 90 and 95 respectively must be effectively designed to shield RF signals. To this end, it has been found that the effectiveness of a radio frequency shield containing seams, slots, holes, etc., varies inversely with the frequency of the radiated energy. Accordingly, the higher the frequency encountered the smaller the openings in the shield must be to provide an effective shield to radio frequency energy. For all but the most severe radio frequency environment, a series of apertures in the shield not exceeding ⅛″ round or square will not reduce the effectiveness of the shield. Since the multiple radio frequency switch of this invention is designed for service in varying ranges of radio frequency environments, the spacings 165 between adjacent fingers of the ground strips are considerably less than ⅛″. Furthermore, the depth of the serrations does not exceed $\frac{3}{32}$″, and their width does not exceed $\frac{1}{32}$″.

As best seen in FIGURES 3, 4, and 5 resilient spring-type grounding strips 150 and 156, extend elevationally along the front and rear faces 83 and 84 of housing 14, and are substantially U-shaped in cross section. Furthermore, the U-shaped, spring-type grounding strips are fixedly mounted, as by welding, brazing, etc., along their elevational dimensions 151 and 157 to ends 83 and 84 of the rectangular housing 14. As better shown in FIGURE 5, the U-shaped spring or resilient ground members terminate in a plurality of opposed pairs 152, 153, and 158, 159 of longitudinally extending, elevationally spaced fingers, with each finger being provided with a wiper contact 166. Resilient grounding strips 150 and 156 extend vertically along the elevationally extent of the path of movement of plunger 56. Accordingly, wiper contacts 166 of both sets of opposed fingers wipe against the perimeter band 62 of the output side of the switch blade and along the copper film 60 of the input side in all positions of switch blade 56.

As has been discussed in considerable detail hereinabove in connection with grounding strips 90, 95, 105 and 110, the resilient U-shaped grounding strips 150 and 156, in addition to providing electrical continuity for grounding any RF frequencies which enter the switch, also serve as a good radio frequency barrier around the periphery of each side of the switch blade 56. To this end the serrated blade engaging edges of the U-shaped grounding members 150 and 156 are designed with the same considerations as were the serrated edges of grounding strips 90, 95, 105 and 110. Serrating the blade engaging edges of the U-shaped grounding members 150 and 156 also aids in providing a uniform spring tension upon the switch blade 56 with a minimum of friction to permit ease of insertion and withdrawal of the plunger 42, by minimizing the friction which must be overcome when the switch is operated, in accordance with the designs discussed hereinabove of grounding strips 90, 95, 105 and 110. In addition the design of the serrations of the U-shaped grounding members 150 and 156 are designed so that no compromise in the shielding of RF signals result. To this end the spacing between adjacent fingers 152, 153, 158 and 159 of the end spring members are considerably less than ⅛", as was the case with the spacing of the grounding strips 90, 95, 105 and 110. In addition the depth of the serrations does not exceed $\frac{3}{32}$" and their width does not exceed $\frac{1}{32}$".

In addition to the importance of the size of the serrations, or spacing between immediately adjacent fingers of all of the grounding strips, the spacing between the grounding strips per se is also of significant importance. Accordingly, the proximity between the terminal ends of longitudinally extending grounding strips 90 and 95 and the resilient U-shaped spring members 150 and 156, and, as well, between the resilient U-shaped spring members 150 and 156 and the terminal ends of longitudinally extending grounding strips 105 and 110 is of extreme importance. It has been found that the longitudinal spacing between the various grounding elements should be made equal to or less than the width of the serrations in the grounding strips. As a result of the proximity between the various grounding elements, the seams between the ground strips, at the corner of the switch blade, are as impervious to radio frequency energy as the serrations in the strips. It should, of course, be emphasized that the deviation in the spacing between the terminal ends of longitudinally extending strips 90, 95, 105 and 110, and the resilient end members 150 and 156 is a function of the frequency of the energy to be blocked. Therefore, the spacing between the end grounding strips 150 and 156 and the longitudinally extending grounding strips 90, 95, 105 and 110 may be varied depending upon the energy to be blocked. Since the switch of this invention will be used in varying radio frequency conditions, the maximum of versatility has been accomplished by maintaining the distance between the terminal ends of the longitudinally extending grounding strips and the bowed fingers of the end mounted U-shaped spring members to within $\frac{1}{16}$".

Looking to FIGURES 1, 3 and 5, switch contacts 140 and 146 are shown to include horizontally longitudinally extending sections 141 and 142 respectively which are fixedly connected to glass epoxy isolator blocks 122 and 126 in a suitable manner. In addition, switch contacts 140 and 146 comprise a number of fixedly positioned longitudinally spaced fingers 143 and 144 in opposed lateral relationship one to the other. Fingers 143 being connected to selected ones of input leads 75 and fingers 144 being connected to selected ones of output leads 76, the actual number of opposed pairs being determined by the number of circuits to be controlled in any particular application. As shown in FIGURE 3, the contact fingers 143 and 144 substantially extend between the opposed side walls 68 and 69 of housing 14. The contact finger elements 143 and 144 are arranged along the length of the switch blade recess formed in housing 14 in opposed pairs. Each of the switch contacts 140 and 146 are formed from a unitary strip of conductive resilient metal. Each comprises transversely extending horizontal members 141 and 142 which are rivetedly connected to the contact isolator blocks 122 and 126 respectively by rivets 170. Furthermore, each are provided with resilient fingers 143 and 144 which extend diagonally downwardly into the recess formed in housing 14, and by virtue of the inherent resiliency of the material of which contact elements 140 and 146 are formed are biased to extend across the width of the recess to engage each other. In order to insure good contact switch contact points 148 and 149 are provided for the resilient fingers 143 and 144 respectively in the manner shown in FIGURE 1.

The switch contacts 140 and 146 are made of suitable conducting material such as, for example, Paliney 7 and have their horizontal longitudinally extending portions 141 and 142 fixedly mounted by rivet-type connectors 170 to the epoxy glass contact isolator blocks 122 and 126. The input leads 75 which enter through aperture 72 of housing 14 are soldered to appropriate ones of contact rivets 170. Output leads 76 which project through aperture 73 of housing 14 are soldered to individual ones of contact rivets 170 in a manner as shown in FIGURE 3. The opposed resilient fingers 143 and 144 are in contact centrally of switch housing 14 along the path of movement of switch contact blade 56. Accordingly, contacts 148 and 149 provide suitable electrical closed connections between the input and output sides 72 and 73 of the switch with the plunger in the position as shown in FIGURE 1. Upon the plunger being actuated by a downwardly directed force applied to cap 45, switch blade 56 will be displaced in a downward direction to spread the resilient switch contact fingers 143 and 144 on opposite sides of switch blade 56. Therefore, since the output side of switch blade 56 is substantially non-conductive except for a perimeter band 62, there will be no continuity between resilient finger contacts 148 and 149 to thus prevent actuation of the output circuit.

Figure 2:
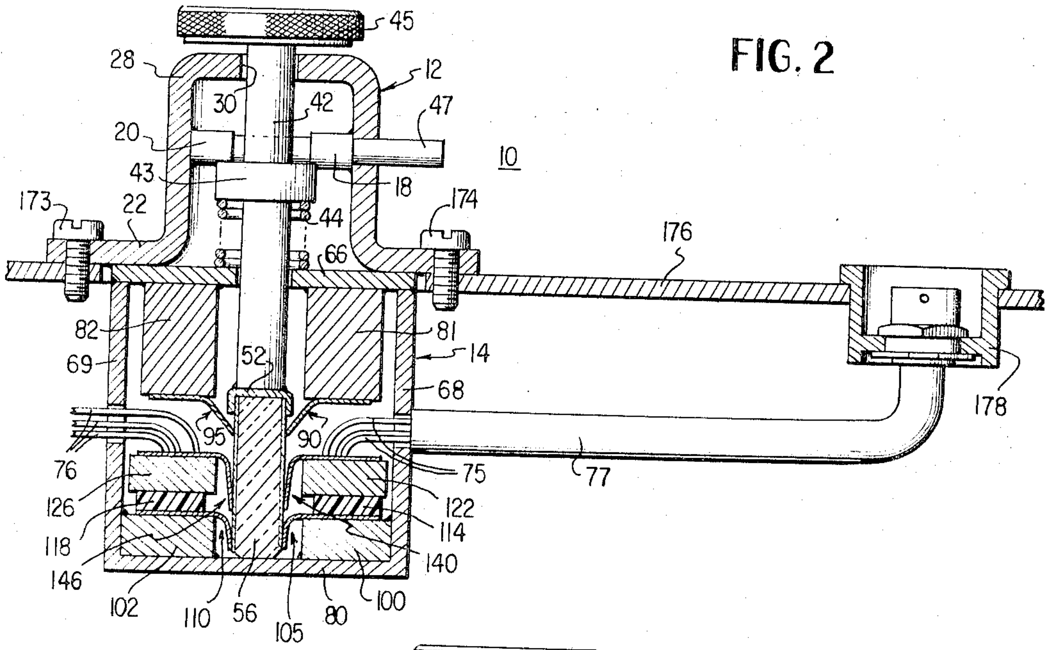
FIGURE 2 illustrates the switching device made in accordance with the invention mounted to a metal launcher shell and illustrates the switch in its open or safe condition to thus permit safe interconnection between the input and output circuits.

As illustrated in FIGURES 1 and 2 input leads 75 which enter through aperture 72 of housing 14 are soldered to appropriate ones of contact rivets 170. Furthermore, input leads 75 are shown to be shielded with a suitable shielding means 77 which is fixedly attached to side 68 about aperture 72. Accordingly, radio frequency signals will be shielded from the input aperture 72 except for those that find their way thereinto through the shielding conduit 77. As will be discussed hereinafter, the RF signals which find their way into switch housing 14 through shield 77 are adequately grounded to prevent any unwanted detonation at the output side.

FIGURE 2 illustrates a RF switching device made in accordance with this invention, removably mounted by way of screws 173 and 174 to an aircraft mounted rocket launcher installation. The shell 176 of the launcher is metal, and the multipole RF switch is attached to the metal shell of the launcher with self-tapping screws 173 and 174. An input connector 178 is shown to diagrammatically represent appropriate activating and control signals for the aircraft's rockets, not shown, but which will be connected to output leads 76. Since the rockets or other similar electro-explosive devices could be accidentally detonated by the radio frequency environments existing at the input connector 178, it is important that proper isolation be provided to insure that spurious RF signals do not accidentally trigger the rockets. To accomplish this end, as shown in FIGURE 2, the switch 10 is removably mounted to the launcher shell 176 and plunger 42 is downwardly reciprocated by an appropriately applied force to cap 45. Retainer pin 47 is then inserted to fix collar 43 and compress biasing spring 44 to prevent undesired return of the plunger to its normal position. While in its depressed position switch contacts 140 and 146 will be opened to thus prevent any electrical connection between input leads 75 and output leads 76. In addition, as has been explained hereinbefore, a suitable radio frequency grounding barrier exists by the cooperation of the grounding strips 90, 95, 105, 110, and resilient end bias grounding strips 150 and 156. As a further precaution, input shield 77 is soldered to the input connector 178 and all input leads 75 are enclosed therewithin. The opposite end of input shield 77 is soldered or welded to side 68 of housing 14 about aperture 72. With the switch as shown in FIGURE 2, the open position, any RF energy which enters the launcher through the input connector is restricted to the area of the switch defined by grounding strip 90 and grounding strip 105. Accordingly, any undesirable RF signals entering housing 14 along the input lead path will be shorted to ground by way of copper film 60 and the grounding strips 90, 105 and end grounding strips 150 and 156. In addition, complete radio frequency isolation between the input and the output sides of the switch is accomplished in a manner as described hereinabove.

It is accordingly seen that through the use of the unique features of the switch made in accordance with this invention complete isolation between the input and output sides of the switch from radio frequency energy is accomplished. In addition, by merely adding to the number of switch contacts 140 and 146, as shown, a large number of simultaneous switching functions may be accomplished with a minimum space and at nominal cost.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed and desired to be secured by United States Letters Patent is:

1. A switching device comprising a switch actuator mounted for reciprocal movement along a pre-determined path of travel between a normal first position and a second position, and a plurality of normally closed switching contacts operatively positioned along said pre-determined path of travel of said switch actuator, said normally closed contacts assuming an open circuit condition in response to movement of said switch actuator therebetween from its normal first position to its second position, a housing having an aperture for reciprocal mounting of said switch actuator, a spring normally biasing said switch actuator in a first position, said switch actuator being moved to its second position against said biasing spring, a conductor on said switch actuator, grounding means operatively positioned in continuous engagement with said switch actuator conductor providing a ground barrier to radio frequency signals, said normally closed contacts including resilient pairs of normally closed switch contact fingers fixedly positioned along the path of travel of said switch actuator, said switch acutator movable to a second position between said normally closed contact fingers to accordingly open the same, said normally closed switch contacts remaining in their open state for as long as said switch actuator remains in its second position, said switch returned to its first state by said biasing spring upon removal of the actuating force.

2. A switching device providing an effective radio frequency barrier between input and output circuits comprising a switch actuator mounted for reciprocal movement along a predetermined path of travel between a normal first position and a second position, and a plurality of normally closed switch contacts operatively positioned along said pre-determined path of travel of said switch actuator, said normally closed contacts assuming an open circuit condition in response to movement of said switch actuator therebetween from its normal first position to its second position, said switch actuator including a plunger reciprocally mounted in a suitable housing, said housing including a recess, a switch blade having electrical conducting and non-conducting portions fixedly mounted to said plunger for reciprocal movement therewith in said recess, opposed grounding strips mounted upon said housing for resilient projection into said recess and continuous engagement with electrically conducting portions of said switch blade irrespective of the position of the same, said normally closed contacts including a plurality of opposed switch contact pairs spaced along said recess and actuatable by movement of said switch blade into its second position, such that one of each of said pairs of opposed switch contacts impinge upon said electrical non-conducting portion of said switch blade to there prevent electrical continuity therebetween.

3. The combination as defined in claim 2 wherein said opposed ground strips include a main body member fixedly connected to said housing and a plurality of equally longitudinally spaced resilient fingers projecting downwardly into said recess for continuous sliding engagement with said switch blade, and said switch blade includes an elongated rectangular body member made of non-conducting material, one side of said switch blade being covered with electrical conducting material, and the other opposite side being provided with a narrow perimeter band of electrical conducting material.

4. The combination of claim 2 wherein said housing is provided with apertures for passage of input and output leads therethrough, and a radio frequency shielding conduit fixedly connected to said housing providing radio frequency isolation for said input lead extending therethrough.

5. A switching device providing an effective radio frequency barrier between input and output circuits comprising a switch actuator mounted for reciprocal movement along a predetermined path of travel between a normal first position and a second position, and a plurality of normally closed switch contacts operatively positioned along said pre-determined path of travel of said switch actuator, said normally closed contacts assuming an open circuit condition in respose to movement of said switch actuator therebetween from its normal first position to its second position, said switch actuator including a plunger reciprocally mounted in a suitable housing, said housing including a recess, a switch blade having electrical conducting and non-conducting portions fixedly mounted to said plunger for reciprocal movement along said recess, opposed ground strips mounted to said housing for resilient projection into said recess and continuous engagement with electrically conducting portions of said switch blade, and said normally closed contacts include a plurality of opposed switch contact pairs spaced along said recess for actuation by the movement of said switch blade into its second position, such that one of each of said pairs of opposed switch contacts impinge upon said electrical non-conducting portions of said switch blade to thereby prevent electrical continuity therebetween, and a second pair of opposed ground strips fixedly mounted to said housing for resilient projection into said recess, said second pair of opposed ground strips impinging upon electrical conducting portions of said switch blade upon said switch actuator assuming its second position within said housing recess.

6. The combination of claim 5 wherein said opposed grounding strips including a main longitudinally extending body fixedly connected to said housing and a plurality of longitudinally spaced resilient fingers projecting downwardly into said recess for sliding engagement with said switch blade, and said switch blade comprises a longitudinal extending rectangular body having its side proximate the input lead contacts of said switch totally covered with an electrical conducting metallic strip, and having its opposite side provided with a narrow perimeter of conducting material.

7. The combination of claim 5 wherein said housing is provided with apertures for passage of input and output leads therethrough, radio frequency shielding means fixedly connected to said housing providing a radio frequency conduit for said input leads.

8. A switching device providing an effective radio frequency barrier between its input and output circuit comprising a switch actuator mounted for reciprocal movement along a pre-determined path of travel between a normal first position and a second position, and a plurality of normally closed switching contacts operatively positioned along said pre-determined path of travel of said switch actuator, said normally closed contacts assuming an open circuit condition in response to movement of said switch actuator therebetween from its normal first position to its second position, said switch actuator including a plunger reciprocally mounted in a suitable housing, said housing including a recess, a switch blade having electrical conducting and non-conducting portions fixedly mounted to said plunger for reciprocal movement along said recess, a first pair of opposed ground strips mounted upon said housing and having longitudinally spaced resilient fingers projecting into said recess for continuous engagement with electrically conducting portions of said switch blade, and said normally closed contacts include a plurality of opposed switch contact pairs spaced along said recess actuatable by movement of said switch blade, such that one of each of said pairs of opposed switch contacts impinge upon said electrical non-conducting portion of said switch blade to thereby prevent electrical continuity therebetween, a second pair of opposed grounding strips fixedly mounted to said housing elevationally removed from said first pair for resilient projection into said recess, said second pair of opposed ground strips having longitudinally spaced resilient fingers projecting into said recess for engagement with electrical conducting portions of said switch blade upon said switch actuator assuming its second position within said housing recess, and a pair of upright ground strips extending elevationally along said housing recess in opposed relationship to each other to continuously slidably engage with said electrical conducting portions of said switch blade, said upright ground strips being positioned proximate to the ends of said longitudinally extending grounding strips by less than the spacing between adjacent resilient fingers thereof.

9. The combination as defined by claim 8 wherein said upright ground strips each comprise a main resilient electrical conducting member fixedly attached to said housing and having opposed bowed resilient fingers projecting into said recess for continuous sliding engagement with electrical conducting portions of said switch blade.

10. A switch comprising a housing, a plunger slidably mounted in said housing and carrying a switch blade having conducting and nonconducting portions, a plurality of pairs of opposed switch contacts mounted in said housing and normally in resilient engagement with one another, said switch blade being movable between said contacts to separate and disestablish contact between the same, and grounding contacts mounted in said housing on both sides of said switch blade in overlying and underlying relationship to said switch contacts, all said grounding contacts being in contact with the conducting portions of said switch blade when said blade is in switch contact separating position, only the switch contact overlying grounding contacts being in contact with the conducting portions of said switch blade when said switch blade is not between said switch contacts.

11. A switch as set out in claim 10 including additional grounding contacts mounted at opposite ends of said switch blade and constantly in contact with the conductive portions thereof.

12. A switch as set out in claim 10 wherein said overlying and underlying grounding contacts comprise elongated strips having pluralities of resilient fingers engageable with said switch blade, with the overyling strips being adjacent an aperture in said housing through which said plunger slides to prevent the entrance of RF energy through such opening.

13. A switch as set out in claim 12 wherein said switch blade has one surface conductive over substantially its entire surface and an opposed surface conductive only at the periphery thereof, said housing having an input aperture opposite said fully conductive surface and an output aperture opposite said partially conductive surface, one portion of said overlying grounding contacts being in constant contact with said fully conductive surface, and additional grounding contacts continuously in contact with conductive surfaces on both surfaces of said switch blade, said additional grounding contacts comprising elongated strips extending substantially at right angles to said overlying and underlying grounding contacts.

14. A switching device comprising a switch actuator mounted for reciprocal movement along a pre-determined path of travel between a first position and a second position, a plurality of normally engaging contact pairs located in said path of travel of said switch actuator, at least one contact of each pair being movable away from its corresponding contact by said switch actuator into an open circuit position when said actuator is moved from said first position to said second position, said actuator including an electrical conductor, and grounding means engaging said electrical conductor and cooperating with said electrical conductor to provide a radio frequency shield between the contacts of each of said pairs when said actuator is in said second position.

15. A switching device according to claim 14 in which all the contacts of said contact pairs are resiliently mounted.

References Cited

UNITED STATES PATENTS

| | | | |
|---|---|---|---|
| 2,883,492 | 4/1959 | Landers ---------- | 200—16 X |
| 3,161,733 | 12/1964 | Bowser et al. -------- | 200—16 |

ROBERT K. SCHAEFER, *Primary Examiner.*

J. R. SCOTT, *Assistant Examiner.*